US012759723B2

(12) United States Patent
Mirza

(10) Patent No.: US 12,759,723 B2
(45) Date of Patent: Oct. 13, 2026

(54) FLUID DISCHARGE SYSTEM

(71) Applicant: Tusas-Turk Havacilik Ve Uzay Sanayii Anonim Sirketi, Ankara (TR)

(72) Inventor: Berke Alp Mirza, Ankara (TR)

(73) Assignee: Tusas-Turk Havacilik Ve Uzay Sanayii Anonim Sirketi, Kahramankazan (TR)

( * ) Notice: Subject to any disclaimer, the term of this patent is extended or adjusted under 35 U.S.C. 154(b) by 129 days.

(21) Appl. No.: 18/785,107

(22) Filed: Jul. 26, 2024

(65) Prior Publication Data

US 2025/0060047 A1 Feb. 20, 2025

(51) Int. Cl.
*B64D 37/00* (2006.01)
*B64D 37/20* (2006.01)

(52) U.S. Cl.
CPC ........... *B64D 37/005* (2013.01); *B64D 37/20* (2013.01)

(58) Field of Classification Search
CPC ................................ B64D 37/12; B64D 37/20
See application file for complete search history.

(56) References Cited

U.S. PATENT DOCUMENTS

| | | | | |
|---|---|---|---|---|
| 8,356,616 | B2 * | 1/2013 | Wyatt | B64D 37/005 251/360 |
| 10,677,206 | B2 * | 6/2020 | Wheelwright | B01D 69/10 |
| 11,814,188 | B2 * | 11/2023 | Barnes | F16L 37/40 |

FOREIGN PATENT DOCUMENTS

| | | |
|---|---|---|
| RU | 2602027 | 11/2016 |

* cited by examiner

*Primary Examiner* — Timothy L Maust

(57) ABSTRACT

This invention relates to a body (2) located on the aircraft, at least one tank (T) located on the body (2) and allows fuel accumulation, at least one valve (3) that allows the water accumulated in the tank (T) to be discharged out of the body (2), at least one fastener (4) that enables the valve (3) to be mounted on the body (2), and a shell(S) located on the air-contacting surface of the body (2).

14 Claims, 2 Drawing Sheets

FLUID DISCHARGE SYSTEM

RELATED APPLICATIONS

Figure 1:
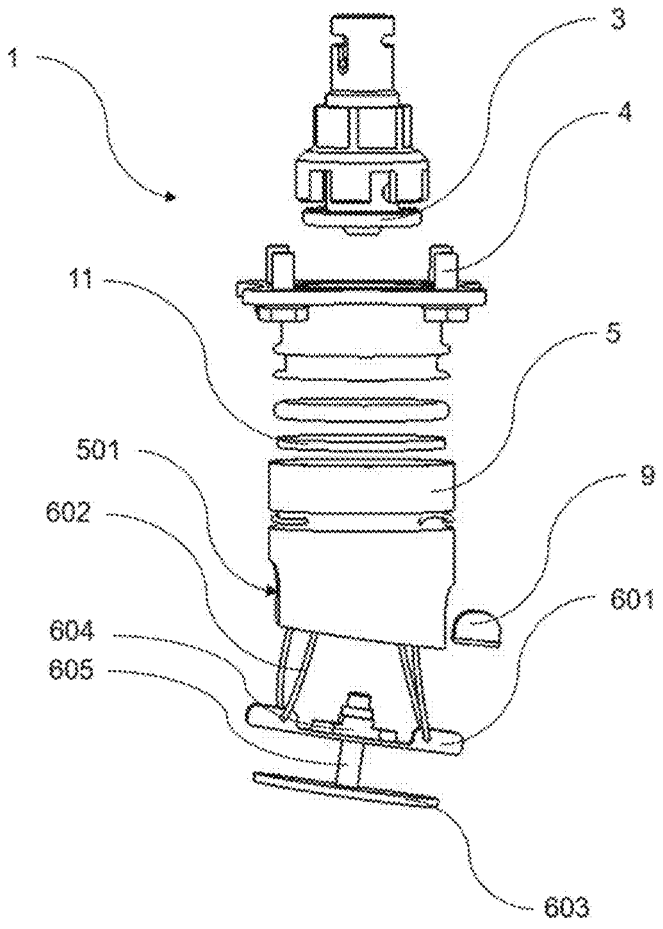

This application claims the benefit of priority of Turkey Patent Application No. TR2023/010034 filed on Aug. 18, 2023. The contents of the above applications are all incorporated by reference as if fully set forth herein in their entirety.

FIELD AND BACKGROUND OF THE INVENTION

This invention relates to systems that discharge water from fuel tanks in aircraft. In aircraft, water accumulates in the fuel tank due to significant fluctuations in pressure or humidity conditions throughout the flight. Since water is denser than fuel, it often accumulates at the bottom of the fuel tank. While the aircraft is on the ground after the flight, the water accumulated at the bottom of the tank is discharged from the tank by the maintainer through drainage valves. Mounting the discharge valve to the shell structure at the base of the aircraft in aircraft whose fuel tank is close to the aircraft floor may cause this valve to be damaged during the landing of the aircraft on the fuselage in emergency situations (such as the landing gear not opening), causing fuel leakage and the possibility of a fire. Discharge valves that are not mounted on the aircraft shell are difficult to access. The covers made to provide this access generally require the removal of many connectors to open a larger cover than is possible and to strengthen the structure to which this cover will be connected. In addition, since there is a possibility that the discharge valves may malfunction, fuel should not flow into the aircraft in case of malfunction. Otherwise, there is a risk of fire inside the aircraft.

SUMMARY OF THE INVENTION

In the Russian patent document numbered RU2602027C1 in the state of the art, a water-discharge valve that can be used in the aircraft fuel tank structure to prevent fuel leakage in case of the deformation of the valve and fuel tank structures during an abnormally hard landing of an aircraft is mentioned. The outer surface of the fuel tank wall is tightly bonded to the inner surface of the aircraft fairing, and the outer lower protrusion of the valve body is disposed adjacent to the outer surface of the aircraft fairing. A groove is made on the outer lower protrusion and forms a weakened zone on the valve body. A flat flexible membrane, which is tightly fixed to the valve body and the inner surface of the fuel tank wall, prevents the leakage of fuel from the fuel tank. The membrane keeps the partially destroyed valve inside the fuel tank and prevents fuel from flowing out of the fuel tank in emergency situations.

By means of a fluid discharge system developed with this invention, fuel and/or water is prevented from leaking into the aircraft in case the valve breaks down during aircraft flight.

One aim of this invention is to act as a buffer between the fuel tank discharge valve and the aircraft outer shell in aircraft, preventing the valve from being damaged and leaking fuel and/or water in possible adverse situations.

Another aim of this invention is to ensure that the fuel tank discharge valve in aircraft can be mounted on the tank wall or demounted during maintenance with fewer fasteners requiring less manpower.

The fluid discharge system defined in the first claim and the claims dependent on this claim, which is realised to achieve the aim of the invention, comprises a body located on the aircraft, and at least one tank located on the body, in which the fuel is accumulated and transported. Depending on the flight conditions of the aircraft, other than the fuel, unwanted water accumulates in the tank, and after the flight, while the aircraft is on the ground, the water is discharged from the tank to the outside of the body by the maintainer through at least one valve. The valve is mounted to the body with at least one fastener. There is a shell on the surface of the body in contact with the air that forms the outer surface of the aircraft.

The fluid discharge system of the invention comprises a reservoir removably installed between the tank and the shell. The reservoir completely surrounds the valve, thus protecting the valve and preventing any fluid such as fuel or water from flowing from the valve into the body and/or leaking into the equipment in case the valve breaks down while the aircraft is operating. There is an apparatus between the reservoir and the shell that allows the reservoir to be removed from the shell when the water accumulated in the tank is to be discharged. The apparatus is located in connection with the reservoir. The apparatus prevents the reservoir from coming into direct contact with the shell, and when it is removed from the shell, the reservoir attached to it also comes out of the shell.

In an embodiment of the invention, the fluid discharge system comprises a first position (I) where the reservoir is removed from the shell on the outer surface of the aircraft, and a second position (II) where the reservoir is located within the aircraft body. Maintenance is required to evacuate unwanted water and/or other fluids other than fuel that accumulate in the aircraft fuel tank after the flight. While the discharging process is carried out, the reservoir is taken out of the shell and placed in the first position (I). After the discharging process is completed, the reservoir is returned to the second position (II) and mounted there by the user, where it is located between the tank and the shell, for the next flight. There is a locking piece on the apparatus in connection with the reservoir. In the second position (II), where the reservoir and the apparatus are located between the tank and the shell, the locking piece is positioned within the reservoir. When moving from the second position (II) to the first position (I), the locking piece is removed from the shell by the user. Thus, the reservoir connected to the locking piece also comes out of the shell together with the locking piece.

In one embodiment of the invention, the fluid discharge system comprises a reservoir that at least partially limits the movement of the valve in the second position (II). The reservoir surrounds the valve all around. In the second position (II), the reservoir protects the valve as an intermediate element between the tank and the shell. Despite the possible deterioration and/or impact of the valve, it counteracts the negative effects before the valve, preventing the valve from being damaged and fuel from leaking into the aircraft.

In one embodiment of the invention, the fluid discharge system comprises more than one wire connecting the reservoir and the locking piece. The wires are located on the reservoir. When the locking piece is moved by the user via wires, the reservoir connected to the locking piece is also moved, allowing the reservoir to be removed from the shell while moving from the second position (II) to the first position (I).

In one embodiment of the invention, the fluid discharge system comprises a groove located on the reservoir. While the locking piece is moved from the second position (II) to the first position (I) by the user by pulling the wires, it is passed through the grooves and taken out of the shell.

In one embodiment of the invention, the fluid discharge system comprises a cover that allows the reservoir to be located in the body in the second position (II), remaining between the tank and the shell. The cover is located on the shell in the second position (II) and allows the valve, reservoir and locking piece to remain fixed within the aircraft. While moving from the second position (II) to the first position (I), the cover is removed from the shell by the user, and thus the reservoir to which it is attached is pulled out of the shell by the user.

In one embodiment of the invention, the fluid discharge system comprises a channel located on the reservoir. The reservoir and the channel above it are preferably circular in cross-section. Multiple, preferably identical, holes are drilled on the channel and on the locking piece. One end of the wires is passed through the holes on the channel and the other end is passed through the holes on the locking piece, and in the second position (II), the wires are collected in the reservoir. The wires are pulled by the user while moving from the second position (II) to the first position (I). Thus, once the locking piece is removed from the shell, if the wires continue to be pulled, the reservoir itself is also moved and removed from the shell. Preferably, the diameter of the channel is at least partially smaller than the diameter of the reservoir so that the wires can be directed into the reservoir through the holes on the channel and do not slip from the outer wall of the reservoir.

In one embodiment of the invention, the fluid discharge system comprises wires surrounding the channel. The wires are preferably passed through holes opened symmetrically according to the centres of rotation chosen to be coaxial of the reservoir and the channel. Thus, when the user pulls it from the channel walls, the reservoir is ensured to come out of the shell in an aligned manner.

In one embodiment of the invention, the fluid discharge system comprises at least one bracket located on the shell. The bracket remains in the reservoir in the second position (II), limiting the rotational movement of the locking piece passing through the grooves and acting as a stopper. The bracket is preferably adhered to the shell from inside the aircraft.

In one embodiment of the invention, the fluid discharge system comprises a nut plate on the apparatus and a bolt located in connection with the nut plate, allowing the cover to be mounted or demounted.

In one embodiment of the invention, the fluid discharge system comprises a locking piece produced in conjunction with the nut plate and a cover produced in conjunction with the bolt. In the second position (II), the locking piece, wires, nut plate and bolt are located inside the body, between the tank and the shell. The cover is located fixedly on the shell. When moving from the second position (II) to the first position (I), the cover to which the bolt is attached moves away from the shell as the user rotates the bolt. Since the nut plate and the locking piece are attached to the bolt, when the bolt moves, the locking piece also moves and is removed from the shell. The locking piece is connected to the reservoir via wires. By removing the locking piece from the shell, the reservoir to which it is connected is pulled and removed from the shell by the user.

In one embodiment of the invention, the fluid discharge system comprises a flange with a slot in it to which a valve is mounted. The valve and flange are mounted by the user outside the aircraft shell using fasteners. The valve and flange mounted outside the shell can be passed through the shell together and mounted on the outer wall of the fuel tank. In this way, the valve can be mounted on the tank wall from outside the tank without requiring access inside the fuel tank. Thus, ease of installation is provided, especially if the fuel tank is located in narrow areas that are difficult to access. At the same time, the valve is installed on the tank with less labour and fewer fasteners.

In one embodiment of the invention, the fluid discharge system comprises at least one sealing element located on the valve, on the flange and/or between the flange and the reservoir. In the second position (II), the flow of fuel and/or water from the tank to the outside of the reservoir and to any equipment or area within the aircraft is prevented, thus sealing is ensured. The sealing element is preferably a gasket. Preferably, there are sealing elements in the form of O-rings on the valve and on the flange, and in the form of both O-rings and rings between the flange and the reservoir.

In one embodiment of the invention, the fluid discharge system comprises a reservoir whose part in contact with the shell is inclined and form compatible in accordance with the body.

BRIEF DESCRIPTION OF THE SEVERAL VIEWS OF THE DRAWING(S)

The fluid discharge system realised to achieve the aim of this invention is shown in the attached figures, and of these figures;

FIG. 1-shows the exploded perspective view of the fluid discharge system.

Figure 2:
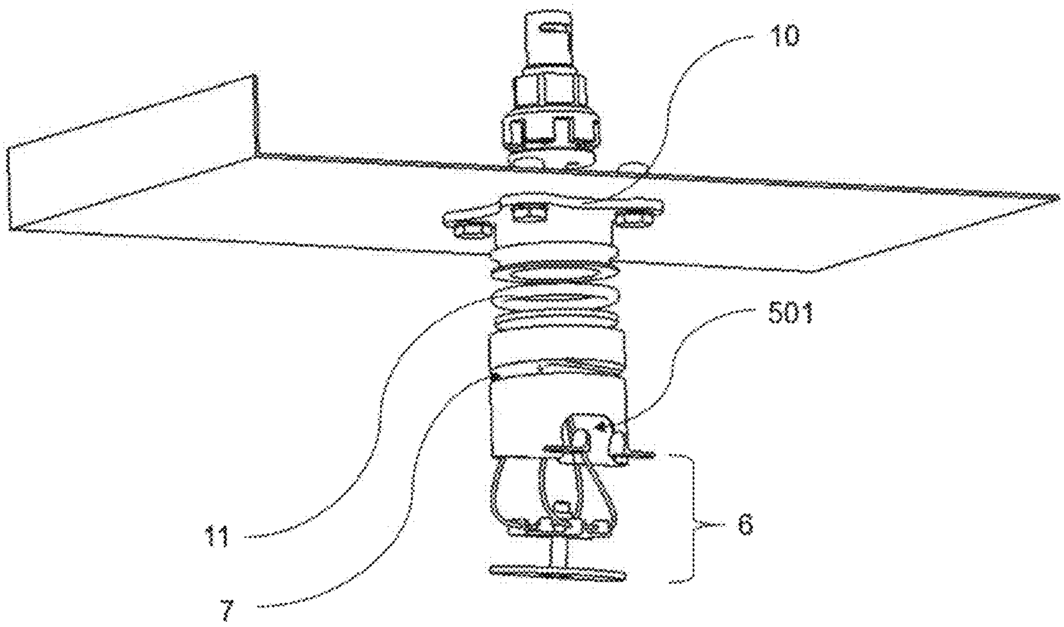

FIG. 2-shows the perspective view of the apparatus, channel, flange and sealing element.

Figure 3:
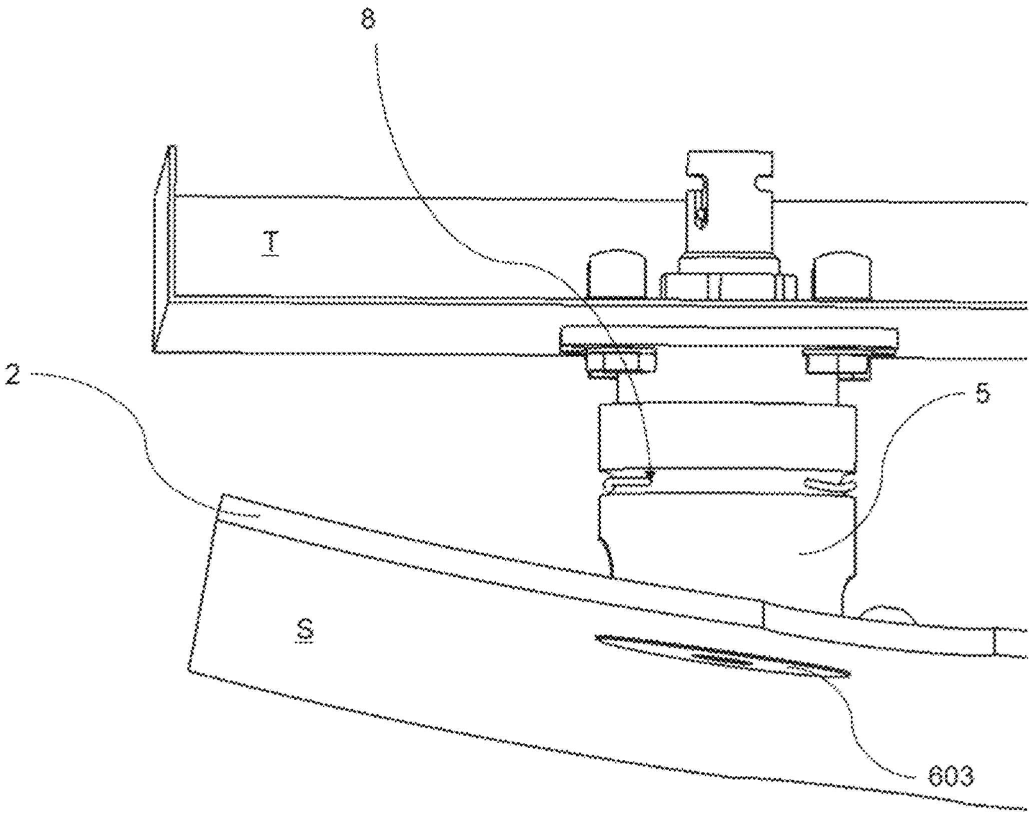

FIG. 3-shows the perspective view of the fluid discharge system in the second position (II).

The parts in the figures are numbered one by one and the equivalents of these numbers are given below.

1. Fluid discharge system
2. Body
3. Valve
4. Fastener
5. Reservoir
  501. Groove
6. Apparatus
  601. Locking piece
  602. Wire
  603. Cover
  604. Nut plate
  605. Bolt
7. Channel
8. Hole
9. Bracket
10. Flange
11. Sealing element
  First position (I)
  Second position (II)
  (T) Tank
  (S) Shell

DESCRIPTION OF SPECIFIC EMBODIMENTS OF THE INVENTION

The fluid discharge system (1) comprises a body (2) located on the aircraft, at least one tank (T) located on the body (2) and allows fuel accumulation, at least one valve (3)

that allows the water accumulated in the tank (T) to be discharged out of the body (2), at least one fastener (4) that enables the valve (3) to be mounted on the body (2), and a shell(S) located on the air-contacting surface of the body (2). (FIG. 1, FIG. 3)

The fluid discharge system (1) of the present invention comprises a reservoir (5) that is removably attached between the tank (T) and the shell(S), surrounds the valve (3) all around, thus protects the valve (3), and an apparatus (6) located between the reservoir (5) and the shell(S) that allows the reservoir (5) to be removed from the shell(S) by the user. (FIG. 2, FIG. 3)

The body (2) is located in the aircraft and contains a tank (T) that contains the fuel that the aircraft needs to use in order to fly. Due to physical conditions during the flight, unwanted water and/or fluids that condense and settle to the bottom in the tank (T) are discharged through the valve (3) after the flight. The valve (3) is mounted on the tank (T) wall with the fastener (4). There is a shell(S) on the outer surface of the aircraft body (2) that is exposed to aerodynamic effects.

A removable reservoir (5) is attached between the tank (T) and the shell(S). The reservoir (5) surrounds the valve (3), thus protecting the valve (3) against external influences. At the same time, in case the valve (3) breaks down while the aircraft is moving, it retains the fuel and/or water that may leak from the tank (T) into the aircraft through the valve (3) throughout the flight. There is an apparatus (6) between the reservoir (5) and the shell(S). The apparatus (6) is used to remove the reservoir (5) from the shell(S) by the user. The apparatus (6) remains in between to prevent the reservoir (5) from coming into direct contact with the shell(S).

In one embodiment of the invention, the fluid discharge system (1) comprises a first location (I) where the reservoir (5) is located outside the shell(S), a second location (II) where the reservoir (5) is located in the body (2), and a locking piece (601) that is located in connection with the reservoir (5) on the apparatus (6) and inside the reservoir (5) in the second position (II) and allows the user to remove the reservoir (5) to which it is connected from the shell(S) by removing it from the shell(S) while moving from the second position (II) to the first position (I). While the aircraft is in motion, due to flight conditions, unwanted fluid other than fuel, mostly water, may accumulate in the fuel tank (T). In such cases, when the aircraft completes its movement and lands on the ground, routine maintenance is performed, and the unwanted fluid is discharged from the tank (T) via the valve (3). While the fluid is being discharged, in the first position (I), the reservoir (5) is taken out of the shell(S) and is located outside the aircraft. Thus, discharge is made from the valve (3). In the second position (II), the reservoir (5) is located within the body (2), between the tank (T) and the shell(S). There is a locking piece (601) on the apparatus (6) in connection with the reservoir (5). In the second position (II), the locking piece (601) remains inside the reservoir (5). While the locking piece (601) moves from the second position (II) to the first position (I), it is removed from the shell(S) by the user. Since the locking piece (601) is located in connection with the reservoir (5), it allows the reservoir (5) to be removed from the shell(S) while it is being removed from the shell(S).

In an embodiment of the invention, the fluid discharge system (1) comprises a reservoir (5) that at least partially limits the movement of the valve (3) in the second position (II). The reservoir (5) surrounds and protects the valve (3). In the second position (II), it ensures that the valve (3) remains stationary and prevents it from moving undesirably during flight. At the same time, it prevents the valve (3) from being damaged and/or leaking fuel due to deterioration and/or impact.

In one embodiment of the invention, the fluid discharge system (1) comprises multiple wires (602) located on the reservoir (5) to connect the reservoir (5) and the locking piece (601) to each other, allow the reservoir (5) to be moved by moving the locking piece (601) and the reservoir (5) to be removed from the shell(S) when moving from the second position (II) to the first position (I). Wires (602) are located on the reservoir (5). They connect the reservoir (5) and the locking piece (601) to each other. When moving from the second position (II) to the first position (I), the locking piece (601) is removed from the shell(S). Thus, it is possible to remove the reservoir (5) to which the locking piece (601) is connected from the shell(S).

In one embodiment of the invention, the fluid discharge system (1) comprises at least one groove (501) that is located on the reservoir (5) and allows the locking piece (601) to be removed from the shell(S) while moving from the second position (II) to the first position (I) by pulling the wires (602). The locking piece (601) is moved from the second position (II) to the first position (I) by passing through the grooves (501). The reservoir (5) also moves from the second position (II) to the first position (I) through the movement of the locking piece (601).

In one embodiment of the invention, the fluid discharge system (1) comprises a cover (603) that ensures that the reservoir (5) is located in the body (2) in the second position (II) between the tank (T) and the shell(S), is removed from the shell(S) by the user when moving from the second position (II) to the first position (I), thus allowing the reservoir (5) to which it is connected to be removed from the shell(S). The cover (603) ensures that the reservoir (5) is located almost completely fixedly between the tank (T) and the shell(S) in the second position (II). In the second position (II), the cover (603) is fixedly located on the shell(S). While moving from the second position (II) to the first position (I), the cover (603) is removed from the shell(S) by the user. The reservoir (5) to which it is connected is removed from the shell(S) by the user.

In one embodiment of the invention, the fluid discharge system (1) comprises at least one channel (7) located on the reservoir (5), multiple holes (8) opened on the channel (7) and on the locking piece (601), and wires (602), one end of which is passed through the hole (8) on the channel (7) and the other end through the hole (8) on the locking piece (601), allowing the locking piece (601) and the reservoir (5) to be moved. More than one, preferably identical, holes (8) are opened on the channel (7) and on the locking piece (601). One end of the wires (602) is passed through the holes (8) on the channel (7) and the other end is passed through the holes (8) on the locking piece (601). While moving from the second position (II) to the first position (I), the locking piece (601) and the wires (602) connected to the locking piece (601) are pulled by the user. Thus, the locking piece (601) is removed from the shell(S). The reservoir (5), which is connected to the locking piece (601) via wires (602), is removed from the shell(S).

In one embodiment of the invention, the fluid discharge system (1) comprises wires (602) that surround the channel (7) and thus ensure that the reservoir (6) comes out of the shell(S) aligned when pulled from the walls of the channel (7) by the user. Wires (602) are passed through holes (8) opened symmetrically with respect to the centre of the channel (7). The other ends of the same wires (602) are passed through the holes (8) on the locking piece (601).

Thus, when the user pulls it from the walls of the channel (7), the reservoir (5) is ensured to come out of the shell(S) in an aligned manner.

In one embodiment of the invention, the fluid discharge system (1) comprises at least one bracket (9) limiting the rotational movement of the locking piece (601) and reservoir (5) that in connection with the locking piece (601), between the tank (T) and the shell(S) in the second position (II) thus acting as a stopper. In the second position (II), the locking piece (601) passes through the grooves (501) so that it remains inside the reservoir (5). The locking piece (601) of the bracket (9) limits the rotational movement of the reservoir (5) in the directions for mounting or demounting, and thus acts as a stopper.

In one embodiment of the invention, the fluid discharge system (1) comprises at least one nut plate (604) located on the apparatus (6), at least one bolt (605) located in connection with the nut plate (604) and allows the cover (603) to be mounted or demounted. The cover (603) is mounted or demounted on the shell(S) via the nut plate (604) and bolt (605) connection.

In one embodiment of the invention, the fluid discharge system (1) comprises the locking piece (601) produced as a single piece with the nut plate (604), the cover (603) produced as a single piece with the bolt (605), bolt (605) and cover (603), which are removed from the shell(S) by the user when moving from the second position (II) to the first position (I), nut plate (604) and locking piece (601), which are connected to the bolt (605) and removed from the shell(S) by the movement of the bolt (605), and wires (602) connected to the locking piece (601) and the reservoir (5), which pull the reservoir (5) to which it is connected by removing the locking piece (601) from the shell(S), thus allowing the reservoir (5) to be removed from the shell. The nut plate (604) and the locking piece (601) are produced as one piece. Likewise, the bolt (605) and the cover (603) are also produced as one piece. In the second position (II), the locking piece (601), wires (602), nut plate (604) and bolt (605) are located inside the body (2). In the second position (II), the cover (603) is fixedly located on the shell(S). While moving from the second position (II) to the first position (I), the bolt (605) is removed by the user. The cover (603) to which the bolt (605) is attached moves away from the shell(S). As the bolt (605) moves, the locking piece (601) also moves and is removed from the shell(S). The locking piece (601) is connected to the reservoir (5) via wires (602). The reservoir (5) to which it is connected is also pulled by the user and removed from the shell(S) through the movement of the locking piece (601).

In one embodiment of the invention, the fluid discharge system (1) comprises at least one flange (10) with a slot inside, to which the valve (3) is mounted by means of connection elements (4) outside the shell(S), thereby allows the valve (3) to be mounted on the tank (T) wall from outside the tank (T) without requiring access to the inside of the fuel tank (T). The valve (3) and flange (10) are mounted outside the shell(S) by the user via fasteners (4). Thus, by being mounted on the fuel tank (T) wall in a single piece, advantages such as ease of assembly and workmanship and time saving are provided, especially in cases where the tank (T) is located in narrow spaces.

In one embodiment of the invention, the fluid discharge system (1) comprises at least one sealing element (11) that is located on the valve (3), on the flange (10) and/or between the flange (10) and the reservoir (5), and prevents the fuel flow from the tank (T) to the outside of the reservoir (5) in the second position (II), thus providing sealing. In the second position (II), the fluid flow from the tank (T) into the aircraft is prevented by the sealing element (11), thus sealing is ensured. The sealing element (11) is preferably a gasket. Gaskets can be in different geometric forms.

In one embodiment of the invention, the fluid discharge system (1) comprises the reservoir (5), the part of which is in contact with the shell(S) and is in inclined form in line with the body (2). The reservoir (5) can be produced in an inclined manner so that it conforms to the form of the inner wall of the body (2) and comes into contact with it.

The invention claimed is:

1. A fluid discharge system for an aircraft having a body, a shell forming an outer surface of the body, and at least one tank carried on the body for accumulating fuel, the fluid discharge system comprising:

at least one valve configured to discharge water accumulated in the tank to outside the body;

at least one fastener mounting the valve to the body;

a reservoir removably installed between the tank and the shell, the reservoir surrounding the valve so as to protect the valve and to contain any fluid leaking from the valve within the reservoir; and an apparatus located between the reservoir and the shell, the apparatus being configured to allow a user to remove the reservoir from the shell.

2. The fluid discharge system according to claim 1, wherein:

the reservoir is movable between a first position in which the reservoir is located outside the shell and a second position in which the reservoir is located within the body between the tank and the shell; and the apparatus comprises a locking piece connected to the reservoir, the locking piece being disposed within the reservoir when the reservoir is in the second position, the locking piece being configured to be removed from the shell by a user to thereby carry the reservoir from the second position to the first position.

3. The fluid discharge system according to claim 2, wherein the reservoir, when in the second position, at least partially limits movement of the valve.

4. The fluid discharge system of claim 2, wherein the apparatus further comprises a plurality of wires connected between the reservoir and the locking piece, the wires being configured to transmit movement of the locking piece to the reservoir so as to allow the reservoir to be removed from the shell when the reservoir moves from the second position to the first position.

5. The fluid discharge system of claim 4, wherein the reservoir comprises at least one groove formed therein, the groove being configured to allow the locking piece to pass therethrough when the locking piece is moved from the second position to the first position by pulling the wires.

6. The fluid discharge system of claim 2, wherein the apparatus further comprises a cover mounted on the shell when the reservoir is in the second position, the cover being removable from the shell by a user to thereby allow the reservoir connected to the cover to be withdrawn from the shell as the reservoir moves from the second position to the first position.

7. The fluid discharge system of claim 4, further comprising:

at least one channel located on the reservoir;

a plurality of holes formed in the channel and a plurality of holes formed in the locking piece; and a plurality of wires, each wire having a first end passed through one of the holes in the channel and a second end passed through one of the holes in the locking piece, the wires being configured to allow the locking piece and the reservoir to be moved together from the second position to the first position.

8. The fluid discharge system of claim 7, wherein the plurality of wires surround the channel, the wires being passed through holes formed symmetrically about a central axis of the channel, such that when a user pulls the wires from walls of the channel, the reservoir is withdrawn from the shell in axial alignment.

9. The fluid discharge system of claim 2, further comprising at least one bracket mounted on the shell and extending into the reservoir when the reservoir is in the second position, the bracket being configured to limit rotational movement of the locking piece and the reservoir in the second position, thereby acting as a rotational stop.

10. The fluid discharge system of claim 6, wherein the apparatus further comprises:

at least one nut plate carried on the apparatus; and at least one bolt engaged with the nut plate, the bolt being configured to mount and demount the cover relative to the shell.

11. The fluid discharge system of claim 10, wherein:

the locking piece and the nut plate are formed as a single integral piece;

the cover and the bolt are formed as a single integral piece;

when the reservoir moves from the second position to the first position, the user rotates the bolt to move the cover away from the shell, the movement of the bolt causing the nut plate and the locking piece to move and be withdrawn from the shell, and the movement of the locking piece pulling the reservoir via the wires so as to withdraw the reservoir from the shell.

12. The fluid discharge system of claim 1, further comprising at least one flange having a slot formed therein, the valve being mounted to the flange by the fasteners outside the shell, the flange and the valve together being passable through the shell and mountable on an outer wall of the tank, thereby allowing the valve to be mounted on the tank wall from outside the tank without requiring access to an interior of the tank.

13. The fluid discharge system of claim 12, further comprising at least one sealing element located on at least one the valve, the flange, or between the flange and the reservoir, the sealing element being configured to prevent fluid flow from the tank to outside the reservoir when the reservoir is in the second position.

14. The fluid discharge system of claim 1, wherein a portion of the reservoir that contacts the shell is inclined to conform to a contour of an inner surface of the body at the location where the reservoir contacts the shell.

* * * * *